(12) United States Patent
Wegh et al.

(10) Patent No.: US 6,251,304 B1
(45) Date of Patent: Jun. 26, 2001

(54) LUMINESCENT MATERIAL

(75) Inventors: René T. Wegh, Zeist; Andries Meijerink, Soesterberg, both of (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/421,358

(22) Filed: Oct. 18, 1999

(30) Foreign Application Priority Data

Oct. 19, 1998 (EP) .................................................. 98203514

(51) Int. Cl.[7] ........................... C09K 11/77; C09K 11/85; H01J 29/20
(52) U.S. Cl. ........................... 252/301.4 R; 252/301.4 H; 313/463
(58) Field of Search .................... 252/301.4 R, 301.4 H; 313/463; 423/263, 463, 464; 315/108

(56) References Cited

U.S. PATENT DOCUMENTS

| | | | |
|---|---|---|---|
| 3,599,109 | * | 8/1971 | Guggenheim ................. 331/94.5 |
| 3,891,852 | * | 6/1975 | Bollen et al. ................. 250/391 |
| 5,891,361 | * | 4/1999 | Kane ................. 252/201.4 H |

FOREIGN PATENT DOCUMENTS

| 186707 | 9/1979 | (NL) ................. C09K/11/81 |
|---|---|---|
| 97/46488 | * 12/1997 | (WO) . |

* cited by examiner

Primary Examiner—Mark Kopec
(74) Attorney, Agent, or Firm—F. Brice Faller

(57) ABSTRACT

A luminescent material includes erbium, gadolinium and an activator chosen from the rare earth elements and/or the transition metals. Upon excitation with radiation having a short enough wavelength, the luminescent material acts as a quantum cutter and has a quantum efficiency of more than 100%.

10 Claims, 1 Drawing Sheet

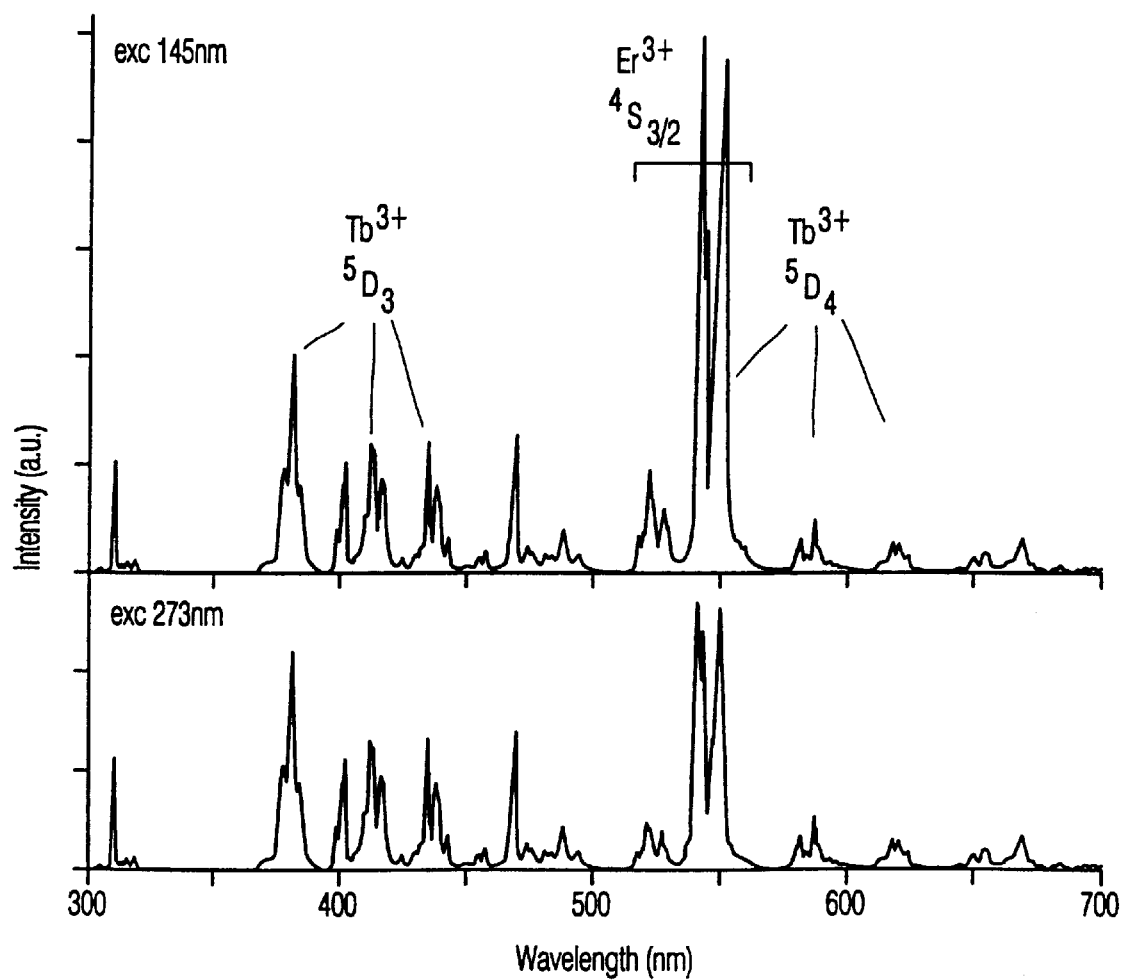

LUMINESCENT MATERIAL

BACKGROUND OF THE INVENTION

The invention relates to a luminescent material having a fundamental lattice consisting of an inorganic crystalline compound, which material comprises at least 1 mol % of gadolinium, at least 0.1 mol % of an activator chosen from the group of transition metals and rare earths, and at least 0.1 mol % of a sensitizer.

A luminescent material of this type is known from Netherlands patent application 186707. In the known luminescent material, the sensitizer is chosen from the group of lead, antimony and bismuth, and the activator is chosen from the group of manganese, terbium and dysprosium. The inorganic crystalline compound and the concentrations of sensitizer and gadolinium are chosen to be such that, if no activator is present in the material but comprises only a sensitizer and gadolinium, the material has the characteristic line emission of gadolinium in the range of 310 nm to 315 nm upon excitation by UV radiation at a wavelength of approximately 254 nm. In other words, upon excitation of the material, an energy transfer from the sensitizer to gadolinium takes place. If, as in the known luminescent material, the material comprises an activator in addition to a sensitizer and gadolinium, an efficient transfer of energy also takes place from gadolinium to the activator, even at a relatively low concentration of the activator. Such a low concentration of the activator renders the luminescent material relatively inexpensive. Moreover, at such a low concentration of the activator, there is little concentration quenching so that a high luminous flux can be obtained. A drawback of the known luminescent material is, however, that the quantum efficiency is limited in that only one visible photon is generated for each exciting UV photon.

SUMMARY OF THE INVENTION

It is an object of the invention to provide a luminescent material having a relatively high quantum efficiency.

According to the invention, the sensitizer is erbium and in that the material, if not activated but only sensitized, has the characteristic line emission of gadolinium in the range of 310 nm to 315 nm upon excitation by UV radiation at a wavelength in the wavelength range of 100 nm to 195 nm. The presence of the characteristic line emission of gadolinium, if the material does not comprise any activator but only sensitizer and gadolinium, means that energy transfer takes place from erbium to gadolinium upon excitation.

It has been found that, if a luminescent material according to the invention is excited with UV radiation of approximately 150 nm, visible light is generated by the activator as well as by the sensitizer. This is a result of the fact that at least a part of the $Er^{3+}$ ions present in the luminescent material and having absorbed an UV photon transfers the excitation energy in two steps. The $^2F_{7/2}$ level, or the $4f^{10}5d$ level of the $Er^{3+}$ ion is excited by the exciting radiation. By means of resonance energy transfer, a part of the energy which is absorbed by the $Er^{3+}$ ion is transferred to gadolinium, such that the $^6D_j$ level or the $^6I_j$ level of a $Gd^{3+}$ ion situated in the ambience of the $Er^{3+}$ ion is excited. The energy remaining at the $Er^{3+}$ ion is predominantly transferred in that the $Er^{3+}$ ion drops back from the $^4S_{3/2}$ level to the fundamental state while emitting a green photon. The energy present at the $Gd^{3+}$ ion is transported to an activator ion by means of energy migration via a number of $Gd^{3+}$ ions. The energy is transferred to the activator ion which subsequently drops back to the fundamental state while emitting a visible photon. Since at least a part of the exciting photons is converted into two visible photons, it is possible to achieve a quantum efficiency of more than 100% with a luminescent material according to the invention. Due to the efficient energy transfer by gadolinium, the concentrations of sensitizer and activator can be chosen to be such that the sensitizer ions are spatially separated from the activator ions so that quenching due to cross-relaxation in sensitizer-activator pairs is prevented and the quantum efficiency is relatively high.

Satisfactory results have been found for luminescent materials according to the invention, in which the activator comprises one or more of the elements from the group of manganese, samarium, europium, gadolinium, terbium, dysprosium, holmium and thulium.

Preferably, the concentration of erbium is in the range of 0.1 mol % to 5 mol % and the concentration of the activator is in the range of 0.1 mol % to 1 mol %.

Satisfactory results have been obtained for luminescent materials according to the invention, which, in addition to erbium, gadolinium and the activator(s), also comprise at least one element chosen from the group of yttrium, scandium and lanthanum. These three elements are relatively inexpensive so that the luminescent material may be relatively inexpensive by making use of one or more of these elements. It has also been found that the location of the maximum of the absorption band of the luminescent material is influenced by these elements, so that addition of one or more of these elements renders it possible to obtain a good overlap of the absorption band of the luminescent material with the emission band of the excitation source. It has further been found that the presence of fluorine influences the location of the $4f^{10}$ 5d level of the $Er^{3+}$ ion in such a way that a favorable absorption behavior of the luminescent material is obtained.

Satisfactory results have been achieved with luminescent materials according to the invention in which the fundamental lattice is constituted by $LiGdF_4$ in which gadolinium may be partly replaced by at least one element chosen from the group of yttrium, scandium and lanthanum.

Luminescent materials according to the invention are very suitable for use in the luminescent screen of a discharge lamp, more particularly a discharge lamp provided with a gastight lamp vessel comprising xenon. A xenon discharge produces relatively much UV radiation in a wavelength range which is very suitable for exciting a luminescent material according to the invention.

These and other aspects of the invention are apparent from and will be elucidated with reference to the embodiments described hereinafter.

BRIEF DESCRIPTION OF THE DRAWINGS

The FIGURE shows plots of radiation intensity vs. wavelength of emission spectra for excitation by radiation having a wavelength of 115 nm and 273 nm, respectively.

DETAILED DESCRIPTION OF THE PREFERRED EMBODIMENTS 0.140 grams of $ErF_3$, 8.754 grams of $GdF_3$, 0.027 grams of $TbF_3$ and 1.079 grams of LiF were dry-mixed in a mortar. The powder was subsequently introduced into a high-frequency heated Bridgeman set-up and consecutively heated to above the melting point and slowly cooled. The purity of the powder was checked by means of X-ray diffraction: the resultant powder appeared to be crystallographically pure. Optical measurements on the powder were performed with a spectrofluorometer adapted for measurements in the vacuum UV. Under excitation by means of radiation at wavelengths of 145 nm and 273 nm, respectively, the emission spectra shown in the FIGURE were obtained. The wavelength of the emitted light is plotted in nm on the horizontal axis. The radiation intensity is plotted in arbitrary units on the vertical axis. In the case of excitation by means of radiation having a wavelength of 145 nm, the $Er^{3+}$ ion is excited from the $4f^{11}$ state to the $4f^{10} 5d^1$ state. The emission spectrum of the powder has a number of lines in the blue spectrum, which are ascribed to emissions from the $^5D_3$ level of the $Tb^{3+}$ ion. Furthermore, the emission spectrum in the green range shows a number of lines corresponding to emissions from the $^5D_4$ level to the $Tb^{3+}$ ion. A number of lines are also visible in the emission spectrum originating from $Er^{3+}$ emission from the $^4S_{3/2}$ level. In the UV, a $Gd^{3+}$ emission is observed at 311 nm. This emission spectrum indicates that an excited $Er^{3+}$ ion drops back from the $4f^{10}5d$ level to the $^4S_{3/2}$ level or to a level directly above this level upon energy transfer to a $Gd^{3+}$ ion. In the latter case, there is a rapid relaxation to the $^4S_{3/2}$ level. The $Er^{3+}$ ion drops back from the $^4S_{3/2}$ level to the fundamental state while emitting a green photon. The energy present at the $Gd^{3+}$ ion is transported to a $Tb^{3+}$ ion by means of energy migration via a number of $Gd^{3+}$ ions. The $Tb^{3+}$ ion absorbs the energy and subsequently drops back to the fundamental state while emitting green light.

In the case of excitation by means of radiation at a wavelength of 273 nm, the $4f^{10} 5d$ level of the $Er^{3+}$ ion is not excited. The $Gd^{3+}$ ion is excited from the $4f^7(^8S_{7/2})$ to the $4f^7(^6I_J)$ state. The energy is subsequently transferred to Tb and also a little bit to Er. The emission spectrum has the same lines as upon excitation by means of radiation at a wavelength of 145 nm. The measured intensity ratios of the different Er and Tb emissions in this spectrum represent the ratios in the case where the $4f^{10}5d$ level of the $Er^{3+}$ ion is not excited and no energy transfer takes place from Er to Tb, as in the case of excitation by means of radiation at a wavelength of 145 nm. It can be calculated from the increase of the $Er(^4S_{3/2})$ emission at 145 nm excitation with respect to 273 nm excitation which percentage of the Er ions at 145 nm excitation transfers only a part of the energy to Gd so that it drops back to the $^4S_{3/2}$ level or a level directly above it. This appears to be approximately 30% for the $LiGdF_4$ lattice used.

What is claimed is:

1. A luminescent material having a fundamental lattice consisting of an inorganic crystalline compound, which material comprises at least 1 mol % of gadolinium, at least 0.1 mol % of an activator chosen from the group of transition metals and rare earths, and at least 0.1 mol % of a sensitizer, characterized in that the sensitizer is erbium and in that the material, if not activated but only sensitized, has the characteristic line emission of gadolinium in the range of 310 nm to 315 nm upon excitation by UV radiation at a wavelength in the wavelength range of 100 nm to 195 nm.

2. A luminescent material as claimed in claim 1, wherein the activator comprises one or more of the elements from the group of manganese, samarium, europium, gadolinium, terbium, dysprosium, holmium and thulium.

3. A luminescent material as claimed in claim 1, wherein the concentration of erbium is chosen to be in the range of 0.1 mol % to 5 mol %.

4. A luminescent material as claimed in claim 1, wherein the concentration of the activator is chosen in the range of 0.1 mol % to 1 mol %.

5. A luminescent material as claimed in claim 1, wherein the material also comprises at least one element chosen from the group of yttrium, scandium and lanthanum.

6. A luminescent martial as claimed in claim 1, wherein the material comprises fluorine.

7. A luminescent material as claimed in claim 1, wherein the fundamental lattice is constituted by $LiGdF_4$ in which gadolinium may be partly replaced by at least one element chosen from the group of yttrium, scandium and lanthanum.

8. A luminescent screen comprising a luminescent material as claimed in claim 1.

9. A discharge lamp provided with a luminescent screen as claimed in claim 8.

10. A discharge lamp as claimed in claim 9, provided with a gastight lamp vessel comprising xenon.

* * * * *